(12) United States Patent
Carl et al.

(10) Patent No.: US 7,464,896 B2
(45) Date of Patent: Dec. 16, 2008

(54) APPARATUS FOR THE ADJUSTMENT OF HORIZONTAL STABILIZERS FOR AIRCRAFT

(75) Inventors: Udo Carl, Hamburg (DE); Axel Vötter, Hamburg (DE)

(73) Assignee: Liebherr-Aerospace Lindenberg GmbH, Lindenberg/Allgau (DE)

(*) Notice: Subject to any disclaimer, the term of this patent is extended or adjusted under 35 U.S.C. 154(b) by 296 days.

(21) Appl. No.: 11/236,405

(22) Filed: Sep. 26, 2005

(65) Prior Publication Data

US 2006/0144996 A1 Jul. 6, 2006

(30) Foreign Application Priority Data

Sep. 28, 2004 (DE) .................. 10 2004 047 008

(51) Int. Cl.
*B64C 13/00* (2006.01)

(52) U.S. Cl. .................................... 244/99.2

(58) Field of Classification Search ......... 244/226–231, 244/99.2, 99.3, 99.5, 87, 89; 477/2–5, 35, 477/36; 475/1, 2, 5, 6, 9
See application file for complete search history.

(56) References Cited

U.S. PATENT DOCUMENTS

| | | | | |
|---|---|---|---|---|
| 2,295,306 A * | 9/1942 | Tampier | ..................... | 244/99.9 |
| 2,869,385 A * | 1/1959 | Geyer | ..................... | 74/89.28 |
| 2,988,307 A * | 6/1961 | Westbury | ..................... | 244/226 |
| 3,143,693 A | 8/1964 | Fearnside et al. | | |
| 3,243,148 A * | 3/1966 | Morris et al. | ................. | 244/230 |
| 3,263,946 A * | 8/1966 | Roberts et al. | ................. | 244/213 |
| 3,603,534 A * | 9/1971 | Barltrop | ..................... | 244/78.1 |
| 3,949,958 A * | 4/1976 | Richter | ..................... | 244/227 |
| 4,180,222 A * | 12/1979 | Thornburg | ..................... | 244/225 |
| 4,273,006 A * | 6/1981 | Woodbury | ..................... | 475/158 |
| 4,441,675 A * | 4/1984 | Boehringer et al. | ......... | 244/213 |
| 4,762,294 A * | 8/1988 | Carl | ..................... | 244/99.9 |
| 4,765,568 A * | 8/1988 | Carl et al. | ..................... | 244/197 |
| 4,779,822 A * | 10/1988 | Burandt et al. | ............. | 244/99.9 |
| 4,789,119 A * | 12/1988 | Bellego et al. | ............. | 244/226 |
| 4,800,798 A * | 1/1989 | Boldrin et al. | ................ | 91/361 |
| 4,834,319 A * | 5/1989 | Ewy et al. | ..................... | 244/99.9 |
| 4,892,274 A * | 1/1990 | Pohl et al. | ..................... | 244/213 |
| 4,964,599 A * | 10/1990 | Farineau | ..................... | 244/195 |
| 5,082,208 A * | 1/1992 | Matich | ..................... | 244/78.1 |
| 5,512,022 A * | 4/1996 | Suzuki | ..................... | 475/2 |
| 5,743,490 A * | 4/1998 | Gillingham et al. | ........ | 244/99.9 |
| 5,769,359 A * | 6/1998 | Rutan et al. | ............. | 244/76 R |
| 6,076,767 A * | 6/2000 | Farley et al. | ............... | 244/78.1 |
| 6,206,329 B1* | 3/2001 | Gautier et al. | ............. | 244/221 |
| 6,227,481 B1 | 5/2001 | Fenny et al. | | |
| 6,231,012 B1* | 5/2001 | Cacciola et al. | ............. | 244/213 |

(Continued)

FOREIGN PATENT DOCUMENTS

EP   1557353   7/2005

*Primary Examiner*—Michael R Mansen
*Assistant Examiner*—Joseph W Sanderson
(74) *Attorney, Agent, or Firm*—Alleman Hall McCoy Russell & Tuttle LLP

(57) ABSTRACT

An apparatus is described for the adjustment of horizontal stabilizers for aircraft in relation to the aircraft axis with mechanical power transmission from two drives to the horizontal stabilizer. The apparatus may include two differential transmissions coupled via a connection shaft that drive the horizontal stabilizer via a mechanical transmission, such as a respective spindle and a spindle nut.

11 Claims, 4 Drawing Sheets

U.S. PATENT DOCUMENTS

| | | | |
|---|---|---|---|
| 6,241,182 B1* | 6/2001 | Durandeau et al. | 244/99.4 |
| 6,443,034 B1* | 9/2002 | Capewell et al. | 74/665 GA |
| 6,651,930 B1* | 11/2003 | Gautier et al. | 244/78.1 |
| 6,726,588 B2* | 4/2004 | Weisz | 475/5 |
| 6,827,311 B2* | 12/2004 | Wingett et al. | 244/99.5 |
| 6,851,648 B2* | 2/2005 | Perni et al. | 244/99.3 |
| 7,007,897 B2* | 3/2006 | Wingett et al. | 244/227 |
| 7,021,587 B1* | 4/2006 | Younkin | 244/178 |
| 7,048,234 B2* | 5/2006 | Recksiek et al. | 244/213 |
| 7,051,975 B2* | 5/2006 | Pohl et al. | 244/99.4 |
| 7,059,563 B2* | 6/2006 | Huynh | 244/99.5 |
| 7,208,939 B2* | 4/2007 | Frederick et al. | 324/207.25 |
| 7,226,020 B2* | 6/2007 | Pohl et al. | 244/213 |
| 7,309,043 B2* | 12/2007 | Good et al. | 244/99.2 |
| 2001/0042811 A1 | 11/2001 | Rodrigues | |
| 2003/0127569 A1* | 7/2003 | Bacon et al. | 244/195 |
| 2004/0200928 A1* | 10/2004 | Degenholtz et al. | 244/75 R |
| 2004/0245386 A1* | 12/2004 | Huynh | 244/75 R |
| 2005/0151027 A1* | 7/2005 | Recksiek et al. | 244/211 |
| 2005/0151028 A1* | 7/2005 | Pohl et al. | 244/213 |

* cited by examiner

APPARATUS FOR THE ADJUSTMENT OF HORIZONTAL STABILIZERS FOR AIRCRAFT

This application claims priority to German Patent Application Serial No. DE 10 2004 047 008.1 filed Sep. 28, 2004, which is hereby incorporated by reference in its entirety for all purposes.

FIELD

The present disclosure relates to an apparatus for the adjustment of horizontal stabilizers for aircraft.

BACKGROUND AND SUMMARY

Horizontal stabilizers for current transport aircraft are adjustable in their setting to the axis of the aircraft. An additional torque about the pitch axis of the aircraft can be generated by this change of the blade angle of the horizontal stabilizer in order to establish trimming conditions or to support the effect of the elevators during maneuvers.

In aircraft construction, systems critical for safety, which also include the horizontal stabilizer adjustment system THSA (=trimmable horizontal stabilizer actuator), have to be secured against simple mechanical failures. For this reason, all load-bearing components of a THSA are designed such that at least two independent mechanical load paths arise from the force introduction points from the horizontal stabilizer up to the connection to the aircraft structure (fail-safe principle).

The fail-safe architecture of a conventional stabilizer system such as is used in transport aircraft today is represented by way of example with reference to FIG. 1. The mechanical power in this system is guided by two drives or motors 1a and 1b via a speed summing differential transmission 2 to a spindle 3 whose spindle nut 4 moves in a translatory manner and thus imposes a pivot movement on the rotatably supported horizontal stabilizer 5.

The motors 1a and 1b are fed by two mutually independent energy systems 6a and 6b and are controlled by a control and monitoring electronic system (motor control electronics MCE) 7a and 7b. Each drive 1a and 1b is provided with a brake (power off brake, POB) 8a and 8b whose braking effect is generated by a biased spring. The spring is relaxed at the command of the respective MCE unit 7a and 7b via an actuating mechanism which draws its power from the energy system of the associated drive 1a and 1b. If the energy system 6a and 6b or the electronics 7a and 7b are not available anymore due to a failure, the POB 8a and 8b is set automatically. This procedure is also called the power-off principle. The differential transmission 2 has the required two independent load paths and is designed such that half a sum of the speeds of both motors 1a and 1b is always transmitted to the output shaft 9. If a motor 1a or 1b is stopped due to an occurring failure and if the corresponding transmission input is blocked with the associated POB 8a or 8b, the remaining intact drive 1a or 1b continues to drive the output shaft 9 at a reduced speed. The power is transmitted to the spindle 3 via a further transmission 10.

Two independent load paths are integrated in the spindle structure, of which one primary load path formed by the actual function spindle 3 bears the complete load in the failure-free operating case, whereas a secondary load path has no load in the failure-free operating case. This secondary load path 11 is realized as a tension rod 11 in the interior of the hollow spindle 3. If the spindle 3 breaks, it is held together by the tension rod 11 so that the force transmission is maintained over the held-together spindle 3 and the spindle nut 4 likewise made in duplicate mechanically and the horizontal stabilizer 5 is fixed with respect to the structure. Both the spindle head 12 of the primary load path and the secondary load path 11 inside the spindle 3 are gimbal-mounted at the aircraft structure. The secondary load path 11 is, for example, gimbal-mounted via a ball and socket joint 13. A so-called "no-back" 14 protects the adjustment system and so the stabilizer against an uncontrolled escape from a secure holding position under the effect of aerodynamic forces at the stabilizer in the case of a simple mechanical failure (e.g. breakage of a drive shaft between the drives 1a and 1b and the differential transmission differential gear 2). The no-back 14 in this case acts as an autonomous mechanical emergency brake.

Apparatus of this type for the adjustment of the horizontal stabilizers for aircraft in accordance with the present prior art are made in duplicate mechanically in all mechanical load-bearing groups—from the transmission 2 and 10 to the spindle head 12, the spindle 3 with secondary load path 11 and motor 4—for reasons of safety. This makes a very complex fail-safe construction necessary which is not testable, or is only testable with limitations, for freedom of failure of both load paths (avoidance of so-called "sleeping failures"). Neither the no-back POB 14 nor the integrated, secondary load path 11 permit an automated test routine in the installed state. With the no-back 14, it is not possible to apply the external loads required for the testing of the function. In modern adjustment systems, a sensor system will be implemented which, following a failure of the primary load path, however, only indicates a load on the tension rod in operation. The previously described complex construction and the automatable testability of the system on the ground, which is only possible in a very restricted manner or even not completely at all, are the major serious disadvantages of the apparatus for the adjustment of the horizontal stabilizers for aircraft of the prior art.

It is one object of the present disclosure to further develop a generic apparatus for the adjustment of horizontal stabilizers for aircraft in relation to the axis of the aircraft with a mechanical power transmission between the aircraft horizontal stabilizer and the aircraft structure such that fail-safe system is mechanically ensured and that it is permitted to test all load-bearing elements of the structure in an automated manner on the ground. In one embodiment it is desired to be able to perform automated testing without any special tools, load simulation or similar.

This and other objects may be solved in accordance with an apparatus for the adjustment of horizontal stabilizers for aircraft in relation to the aircraft axis with a mechanical power transmission of two drives to the horizontal stabilizer is provided in which two differential transmissions coupled via a connection shaft drive the horizontal stabilizer via a mechanical transmission, such as one spindle and one spindle nut each. Accordingly, instead of a secondary load path integrated in the spindle—such as has been customary up to the present day in accordance with the aforesaid discussion of the prior art—a structure is formed with two mechanically separate primary load paths. These two separate primary load paths may respectively include: differential transmissions, transmission output shafts, transmissions, spindles and spindle nuts up to the plate on the horizontal stabilizer, each made simply in a mechanical construction manner.

In one example, the two differential transmissions can also effect an automatic load and speed synchronization of the spindles with different speeds of the drives.

Also, the apparatus each only have simply load-bearing components.

A speed sensor for the determination of the speed of the connection shaft and a shaft brake for the braking of the connection shaft may be particularly advantageously present, which allow cases of breakage in a mechanical component of the power-carrying load paths to be recognized and to reliably fix the system in the case of failure.

It is furthermore advantageous for shaft brakes and sensors to be arranged in each case on the drive shafts arranged between the drives and the differential transmissions and for additional sensors to be present for the speed recognition of the transmission output shafts. Mechanical failures and the function capability of all brakes can be determined using automatable test routines via MCEs likewise advantageously present for the evaluation of the sensor signals. An integrity test of the total system is thus possible on the ground.

The drives and brakes can advantageously be based on hydraulic power supply, electric power supply or a combination thereof.

BRIEF DESCRIPTION OF THE FIGURES

Further features, details and advantages of the present disclosure will be explained with reference to an embodiment shown in the drawing. There are shown.

DETAILED DESCRIPTION

Figure 1:
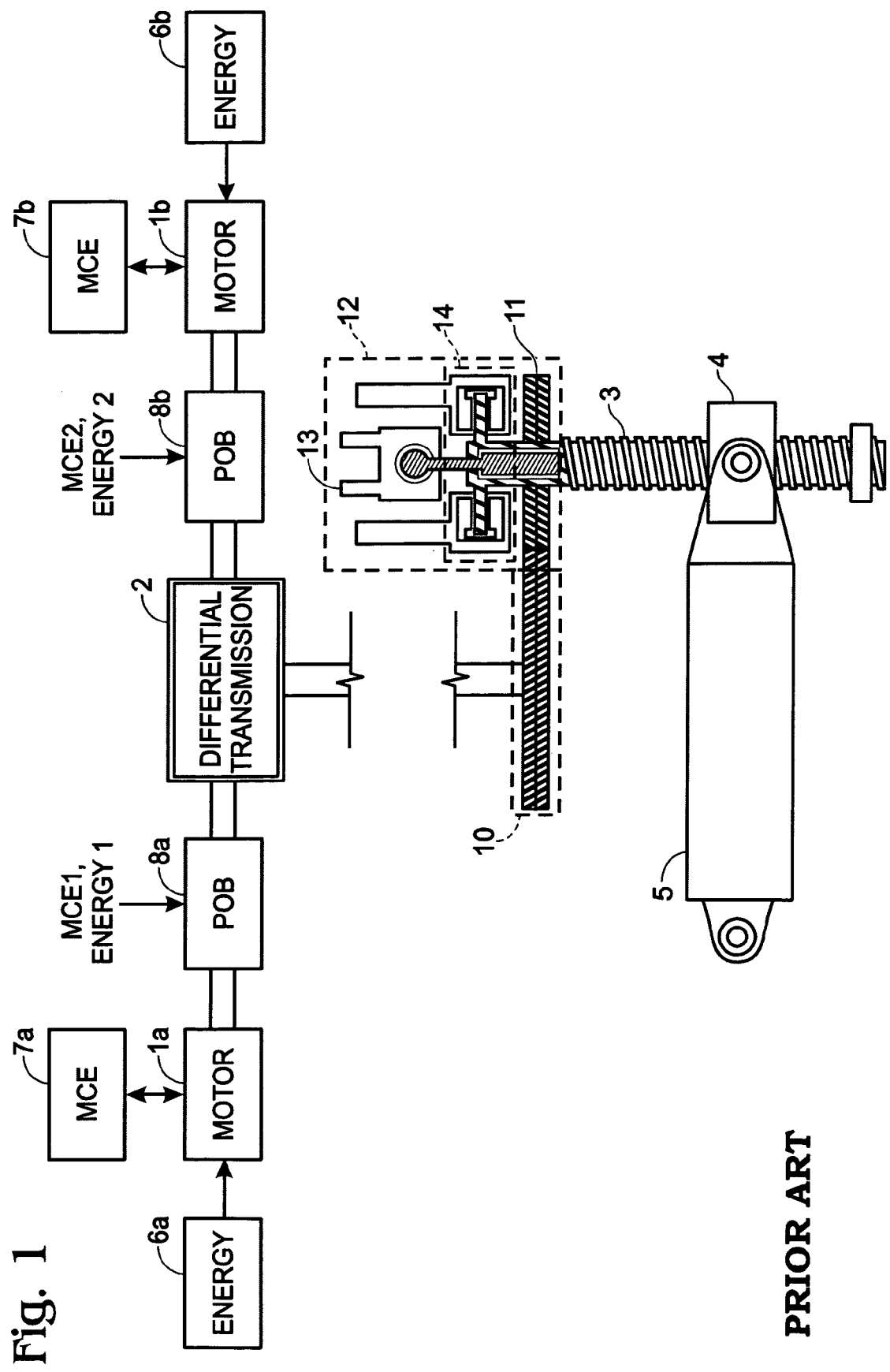
FIG. 1: a schematic representation of a trimmable horizontal stabilizer actuator (THSA) in accordance with the prior art.
Figure 2:
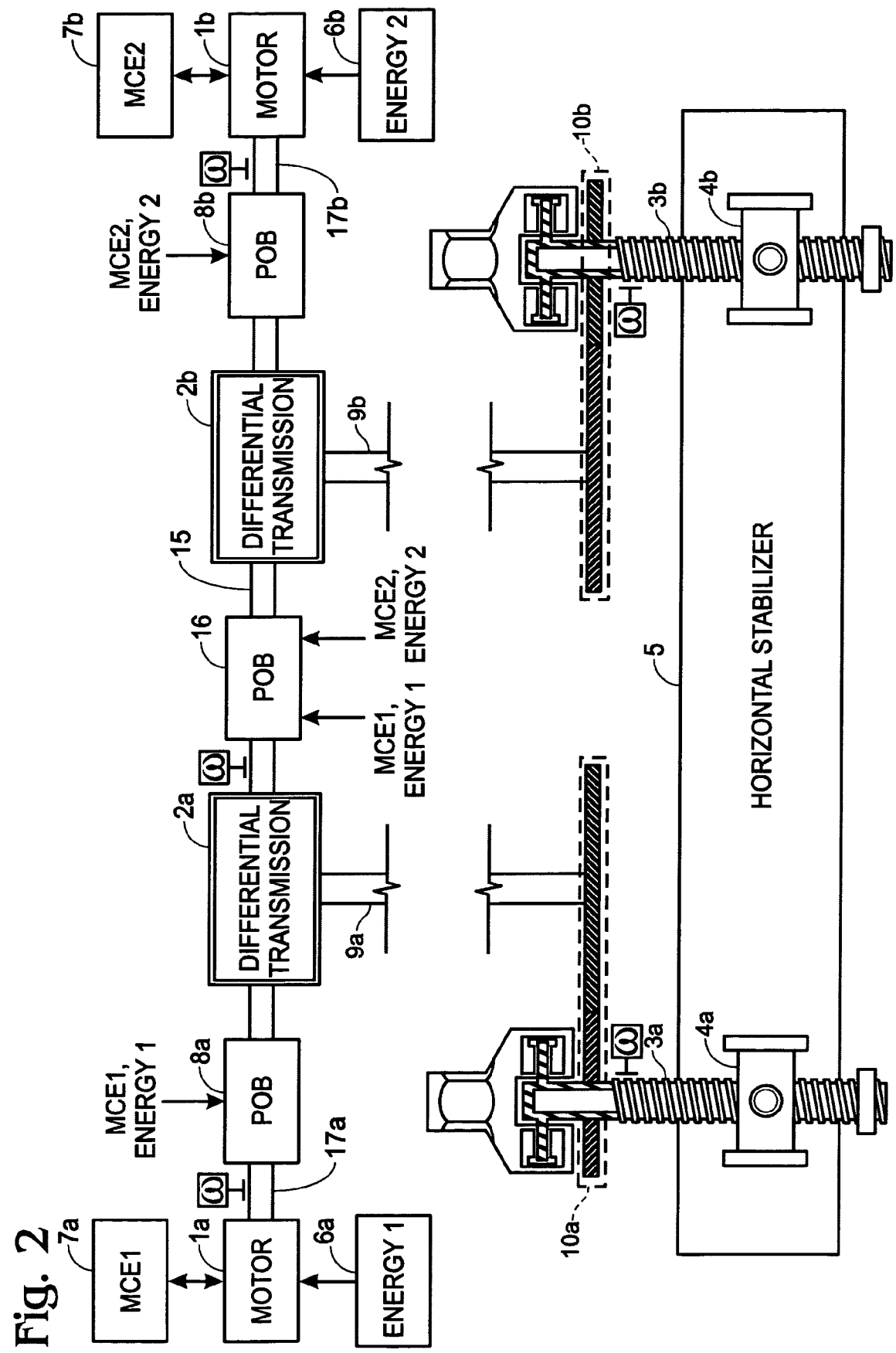
FIG. 2: a schematic representation of the apparatus in accordance with the present disclosure in accordance with a first embodiment.

In the embodiment variant in accordance with FIG. 2, those parts which were already contained in the device in accordance with the prior art of FIG. 1 are designated with the same reference numerals.

In the embodiment variant in accordance with FIG. 2, two separate load paths having differential transmissions 2a and 2b, transmission output shafts 9a and 9b, transmissions 10a and 10b, spindles 3a and 3b and spindle nuts 4a and 4b up to the plate at the horizontal stabilizer 5 are provided, each made simply in a mechanical construction manner. The mechanical power is provided by two drives or motors 1a and 1b which are fed by two mutually independent energy systems 6a and 6b and are controlled by motor control electronics (MCE) 7a and 7b.

A major feature is presented by the two differential transmissions 2a and 2b which are coupled via a connection shaft 15 and, in failure-free normal operation, transmit the mechanical power of the motors 1a and 1b to the respectively associated spindles 3a and 2b. The connection shaft 15 is provided with a so-called power-off brake (POB) 16 which can be opened by either of the two MCEs 7a and 7b. On the failure of both energy systems 6a and 6b or of both MCEs 7a and 7b, the POB 16 is actuated via a biased spring (not shown in any more detail here).

The drive shafts 17a and 17b each extend from the motors 1a and 1b to the differential transmissions 2a and 2b. Both drive shafts 17a and 17b are provided with so-called power-off brakes 8a and 8b which are supplied via the energy system 6a and 7b and are switched via the electronics 7a and 7b of the associated motor 1a and 1b. The mechanical power is transmitted from the respective transmission output shaft 9a and 9b to the spindles 3a and 3b via a respective further transmission stage 10a and 10b.

Figure 3:
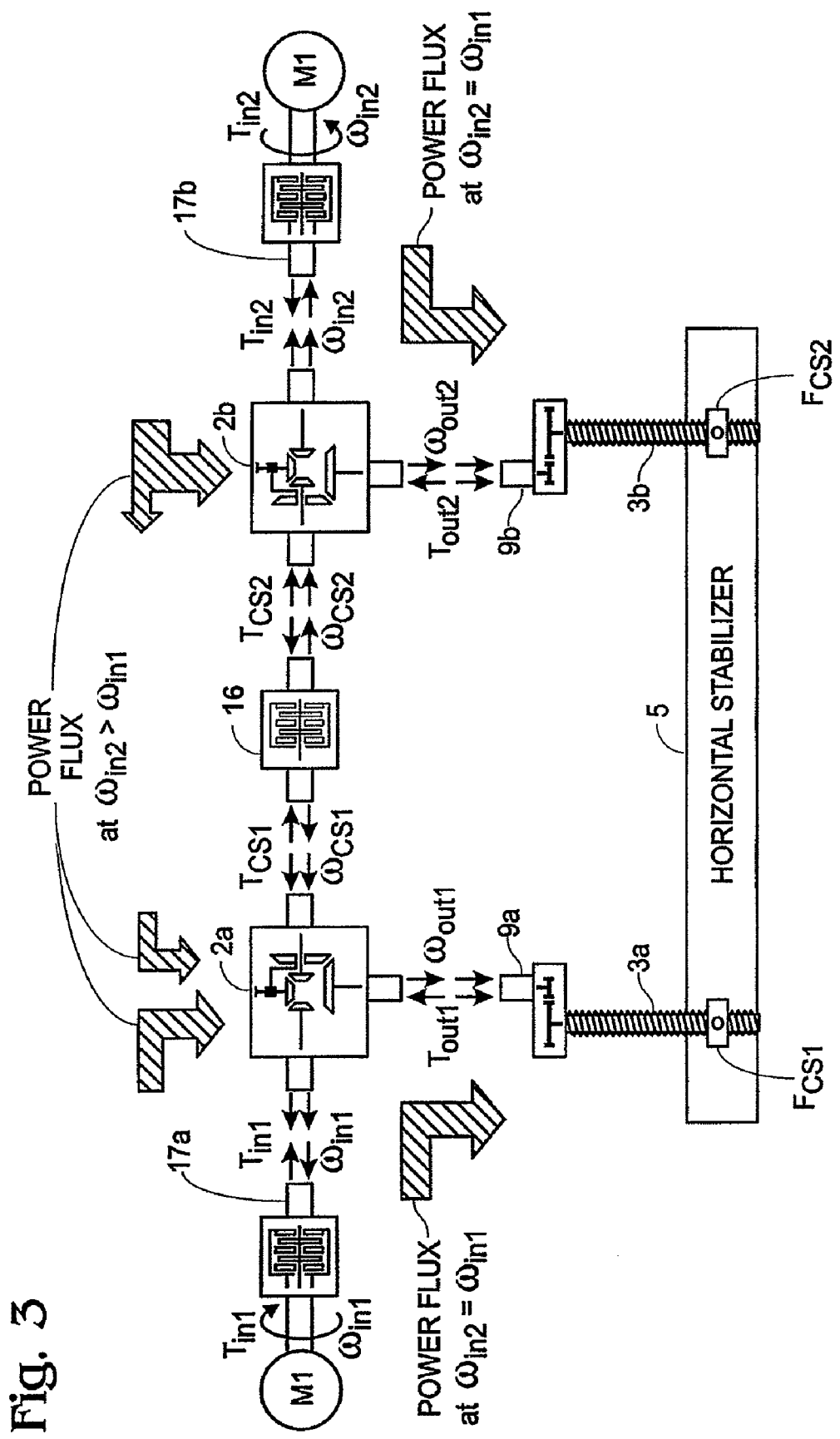
FIG. 3: a schematic representation of the power flux in the apparatus in accordance with FIG. 2.

The respective power fluxes in the system in accordance with the present disclosure are shown in FIG. 3. The differential transmissions 2a and 2b shown schematically in the figure act in a speed summing manner. Half the sum of the speeds of the motor shaft $\omega_{in}$ and of the connection shaft $\omega_{cs}$ is thereby always applied to the transmission output shaft 9a or 9b according the principle since it leads to the spindle 3a or 3b. Likewise according to the principle, the motor shaft 17a or 17b and the connection shaft 15 have to guide torques $T_{in} = T_{cs}$ of equal amount which are supported at the transmission output shaft 9a or 9b. Twice the torque $T_{out}$ of the motor and connection shaft 15 is thus applied to the transmission output shaft 9a or 9b without taking the efficiencies into account. Since both spindles 3a and 3b are connected to the rigid horizontal aircraft stabilizer 5, the speeds of both transmission output shafts $\omega_{out,1} = \omega_{out,2}$ must also be identical. Different speeds of the motors 1a and 1b are therefore distributed via the connection shaft 15 such that identical speeds apply at both transmission output shafts 9a and 9b. In failure-free normal operation, the system of the two spindles 3a and 3b therefore synchronizes itself kinematically. If the two engine speeds are identical, the connection shaft 15 is stationary. If they are different, the faster motor 1a or 1b drives a speed difference via its associated differential transmission 2a or 2b and the connection shaft 15 into the second differential transmission 2b or 2a.

The resulting power fluxes are shown in FIG. 3. With identical input speeds $\omega_{in,1}$ and $\omega_{in,2}$, the connection shaft 15 is stationary $\omega_{cs} = 0$) so that the power flux is guided without branching from the motor shaft 17a or 17b to the output shaft 9a or 9b. If, however, the input speed $\omega_{in,2}$ is larger than $\omega_{in,1}$, some of the power of the motor 1b is transmitted via the connection shaft 15 and the differential transmission 2a to the transmission output shaft 9a due to the speed summing properties resulting from the principle of the differential transmissions 2a or 2b as well as the output speeds $\omega_{out,1} = \omega_{out,2}$ coupled via the aircraft horizontal stabilizer 5 and thus identical. Since, as already mentioned, the connection shaft 15 and the two motor shafts 17a or 17b have equal torques due to the principle which are supported at the transmission output shafts 9a or 9b, both spindles 3a and 3b always carry the same load. The power fluxes in the two spindles 3a and 3b are thus identical in each operation condition.

Both motors 1a and 1b are operated with speed regulation in a superimposed position control circuit. Angle and speed sensors are provided both for the control of the motors 1a and 1b, for the positioning of the aircraft horizontal stabilizer 5 and for the monitoring of cases of breaking or jamming of the total adjustment system. The position of the aircraft horizontal stabilizer is controlled and monitored via angle sensors 18a and 18b at the two spindles 3a and 3b. This signal serves as feedback of the control parameter for the motors 1a and 1b in the position control circuit. The speed control of the motors 1a and 1b needs the signals of the speed at the motor shafts 19a and 19b and at the connection shaft 20. The system can be operated in a controlled manner and can be completely monitored for cases of breaking and jamming with these signals.

If a break occurs at any position in the powertrain, no power can be transmitted at this position. Since all torques mutually support one another at the differential transmission 2a and 2b, the shaft speed $\omega_{cs}$ will increase abruptly. This jump in speed is recognized by each of the integrated MCEs (7a, 7b) which thereupon stop the system. The motors 1a and 1b are switched off when stopped and the POBs 8a and 8b brake the motor shafts 17a and 17b and the POB 16 brakes the connection shaft 15.

Jamming cases are recognized at any position of the load-bearing components, for example the differential transmissions 2a and 2b, the transmissions 10a and 10b, the spindles 3a and 3b and the spindle nuts 4a and 4b at predetermined control rates of the active drive both in normal two-motor operation and in one-motor operation, also with reference to signal patterns of position sensors in conjunction with speed sensors 18a, 18b, 19a, 19b and 20.

Figure 4:
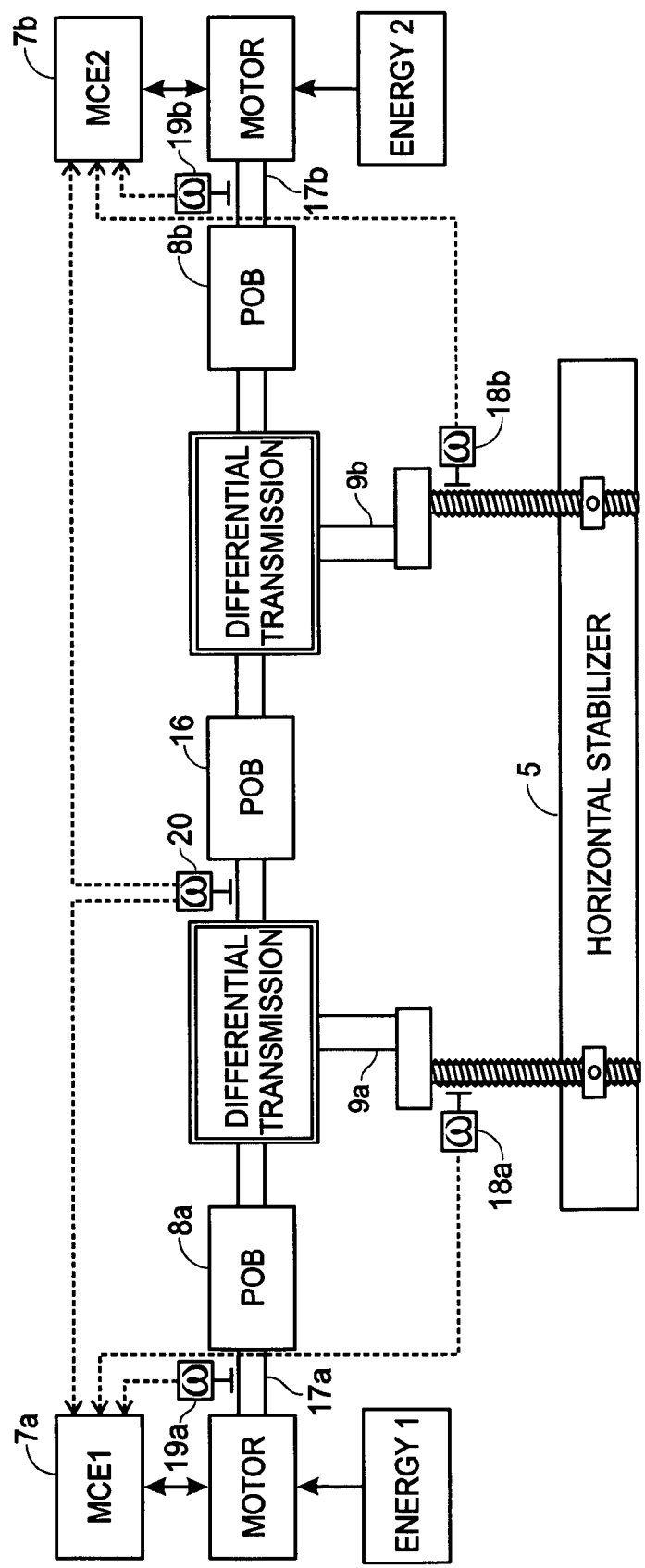
FIG. 4: a representation in accordance with the embodiment of FIG. 2 in which the sensor system of the apparatus is drawn.

The arrangement of brakes and sensors in accordance with the present disclosure shown in FIG. 4 permits a complete check of all mechanical components for mechanical failures such as breaking or jamming in an automatic test and of the brakes themselves for functional capability under operating loads. This checking capability by means of specific automated test routines is possible on the ground.

Test routines can, for example, be defined as follows:

The motor shaft 17a can be checked for breakage as follows: The motor 1a is switched on; the brake 8a is set. The speed sensor 19a must assume the value 0 with an intact motor shaft 17a.

A case of breakage in the total powertrain of the motor shaft 17a, 17b is generally checked over the differential transmission 2a, 2b, over the transmission output shaft 9a, 9b, over the transmissions 10a, 10b and the spindles 3a, 3b toward the aircraft horizontal stabilizer 5 in that the respective speed sensor signal on the driving motor side is zero with an intact system for the case that the motors 1a or 1b are driven on braking by means of the POBs 8a and 8b and of the POB 16 on the connection shaft 15.

For the case that a jamming case is found at any position in a powertrain of the differential transmission 2a or 2b, the transmission 10a, 10b and the spindles 3a, 3b or the spindle nuts 4a and 4b, the speed sensor signal of the driving motor 1b or 1a must be not equal to 0 in the case that a motor brake 8a or 8b engages and the motor 1b or 1a opposite it is driving.

The invention claimed is:

1. An apparatus for adjusting a horizontal stabilizer of an aircraft in relation to an aircraft axis, the apparatus comprising:
   two differential transmissions, each having a transmission output shaft, the two differential transmissions coupled via a connection shaft and configured to transmit mechanical power to the horizontal stabilizer from two independent drives via two separate, primary load paths,
   the connection shaft configured to be stationary when the two independent drives have equal speed and to distribute a speed difference between the two independent drives such that the transmission output shafts have equal speed.

2. An apparatus in accordance with claim 1, wherein the two separate load paths include two spindles, and wherein the two differential transmissions bring about an automatic load and speed synchronization of the two spindles at different speeds of the drives.

3. An apparatus in accordance with claim 1, wherein each differential transmission contains only load-bearing components.

4. An apparatus in accordance with claim 1, further comprising:
   a speed sensor for the determination of the speed of the connection shaft and
   a shaft brake for the braking of the connection shaft.

5. An apparatus in accordance with claim 4, further comprising at least two shaft brakes, two drive shafts, and at least two sensors, where a first sensor is arranged on a first of the two drive shafts and a second sensor is arranged on a second of the two drive shafts, and where each drive shaft is arranged between a respective drive and differential transmission, and further comprising at least two additional sensors for speed recognition of transmission output shafts.

6. An apparatus in accordance with claim 5, further comprising monitor control electronics for the evaluation of one or more sensor signals indicating at least one of a mechanical failure and a function capability of at least one of a brake and the horizontal stabilizer via an automatable test routine.

7. An apparatus in accordance with claim 6, wherein the two drives and the at least two shaft brakes are powered by at least one of a hydraulic power supply and an electrical power supply.

8. An apparatus in accordance with claim 1, wherein the two separate load paths include a first and second mechanical transmission device, each having a spindle and a spindle nut.

9. An apparatus in accordance with claim 1, wherein the mechanical transmission includes a first and second spindle, and wherein the two differential transmissions bring about a kinematic load and speed synchronization of spindles at different speeds of the drives, where the spindles carry an equal load.

10. An aircraft having an axis, comprising:
    a horizontal stabilizer, the horizontal stabilizer adjustable in relation to the aircraft axis;
    a connection shaft;
    a first drive;
    a second drive independent from the first drive;
    the connection shaft configured to be stationary when the first and second drives have equal speed and to distribute a speed difference between the first and second drives;
    a mechanical transmission;
    a first differential transmission having at least a first input and a first and second output;
    a second differential transmission having at least a first input and a first and second output, where the first and second differential transmissions are coupled via the connection shaft at the first outputs of the differential transmissions, and where the first and second differential transmissions are configured to drive the horizontal stabilizer via the mechanical transmission via a first and second mechanical load path coupled through the second outputs of the differential transmissions, the first mechanical load path between the first drive and the horizontal stabilizer and the second mechanical load path between the second drive and the horizontal stabilizer.

11. An aircraft in accordance with claim 10, wherein the mechanical transmission includes a first and second spindle, and wherein the two differential transmissions bring about a kinematic load and speed synchronization of spindles at different speeds of the drives, where the spindles carry an equal load.

* * * * *